United States Patent
Yamada et al.

(10) Patent No.: US 10,730,782 B2
(45) Date of Patent: Aug. 4, 2020

(54) METHOD FOR MANUFACTURING GLASS MATERIAL AND DEVICE FOR MANUFACTURING GLASS MATERIAL

(71) Applicant: NIPPON ELECTRIC GLASS CO., LTD., Otsu-shi, Shiga (JP)

(72) Inventors: Tomoko Yamada, Otsu (JP); Fumio Sato, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 496 days.

(21) Appl. No.: 15/316,590

(22) PCT Filed: May 29, 2015

(86) PCT No.: PCT/JP2015/065618
§ 371 (c)(1),
(2) Date: Dec. 6, 2016

(87) PCT Pub. No.: WO2015/190323
PCT Pub. Date: Dec. 17, 2015

(65) Prior Publication Data
US 2017/0158549 A1 Jun. 8, 2017

(30) Foreign Application Priority Data

Jun. 13, 2014 (JP) .................. 2014-122119
Mar. 31, 2015 (JP) .................. 2015-073819

(51) Int. Cl.
*C03B 32/00* (2006.01)
*C03B 40/04* (2006.01)
(Continued)

(52) U.S. Cl.
CPC .............. *C03B 32/00* (2013.01); *C03B 19/02* (2013.01); *C03B 19/1055* (2013.01); *C03B 40/04* (2013.01)

(58) Field of Classification Search
CPC ..................................................... C03B 32/00
See application file for complete search history.

(56) References Cited

U.S. PATENT DOCUMENTS 4,424,435 A * 1/1984 Barnes, Jr. .......... B23K 26/244
219/121.64
5,155,651 A 10/1992 Yoda et al.
(Continued)

FOREIGN PATENT DOCUMENTS

| CN | 102574204 A | 7/2012 |
| CN | 103803804 A | 5/2014 |

(Continued)

OTHER PUBLICATIONS

Official Communication issued in Japanese Patent Application No. 2019-012907, dated Nov. 26, 2019.

*Primary Examiner* — Joseph S Del Sole
*Assistant Examiner* — Melody Tsui
(74) *Attorney, Agent, or Firm* — Keating and Bennett, LLP

(57) ABSTRACT

Provided is a method that can manufacture a glass material having excellent homogeneity by containerless levitation. A block (12) of glass raw material is heated and melted by irradiation with a plurality of laser beams with the block (12) of glass raw material held levitated, thus obtaining a molten glass, and the molten glass is then cooled to obtain a glass material. The plurality of laser beams include a first laser beam (13A) and a second laser beam (13B). A size (θ) of an angle formed between the first laser beam (13A) and the second laser beam (13B) is 0° or more but less than 180°. A center (C1) of a spot (S1) of the first laser beam (13A) on the surface of the block (12) of glass raw material and a center (C2) of a spot (S2) of the second laser beam (13B) on the surface of the block 12 of glass raw material are different from each other.

5 Claims, 15 Drawing Sheets

(51) Int. Cl.
*C03B 19/02* (2006.01)
*C03B 19/10* (2006.01)

(56) References Cited

U.S. PATENT DOCUMENTS

2006/0205095 A1* 9/2006 Yono ..................... C03C 4/00
438/2
2012/0237745 A1 9/2012 Dierkes et al.
2013/0091897 A1* 4/2013 Fujii ................. C03B 33/0222
65/112

FOREIGN PATENT DOCUMENTS

| JP | 02-154978 A | 6/1990 |
| JP | 08-259242 A | 10/1996 |
| JP | 11-241888 A | 9/1999 |
| JP | 2006-248801 A | 9/2006 |

* cited by examiner

[Fig. 1]
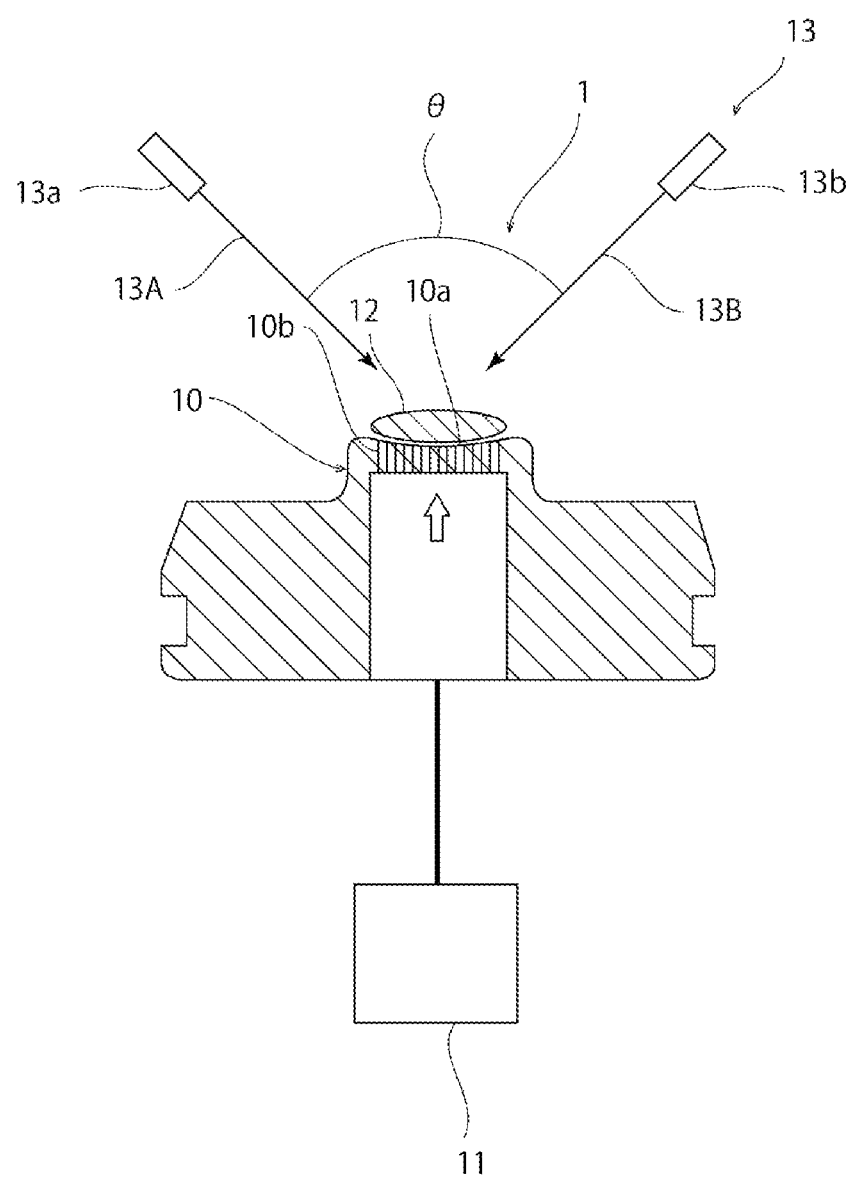

[Fig. 2]
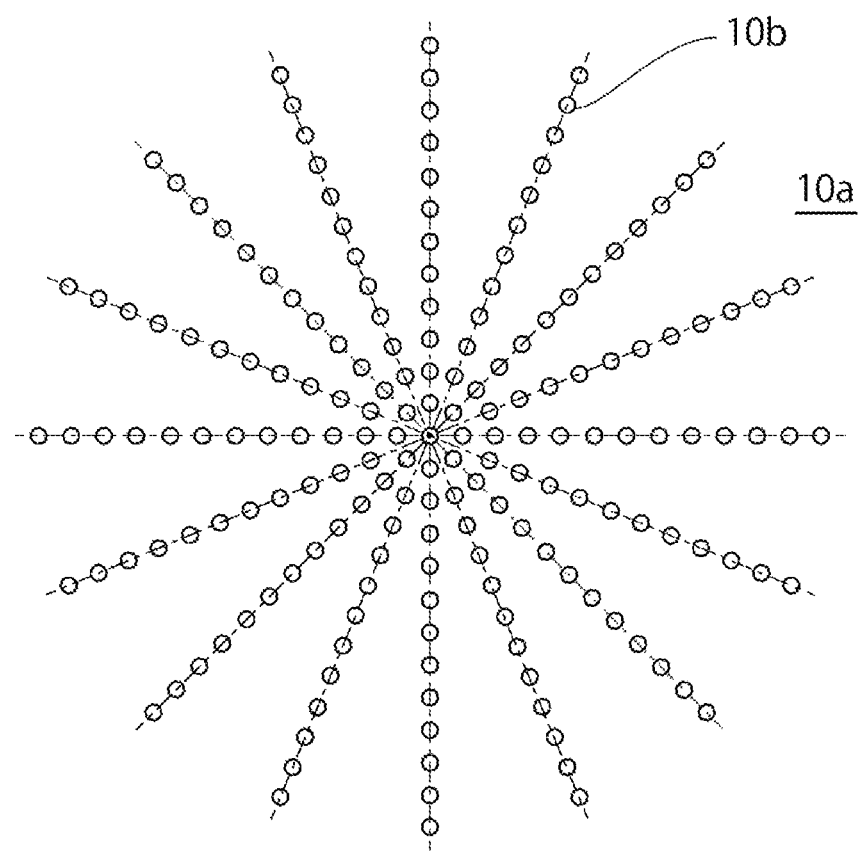

[Fig. 3]
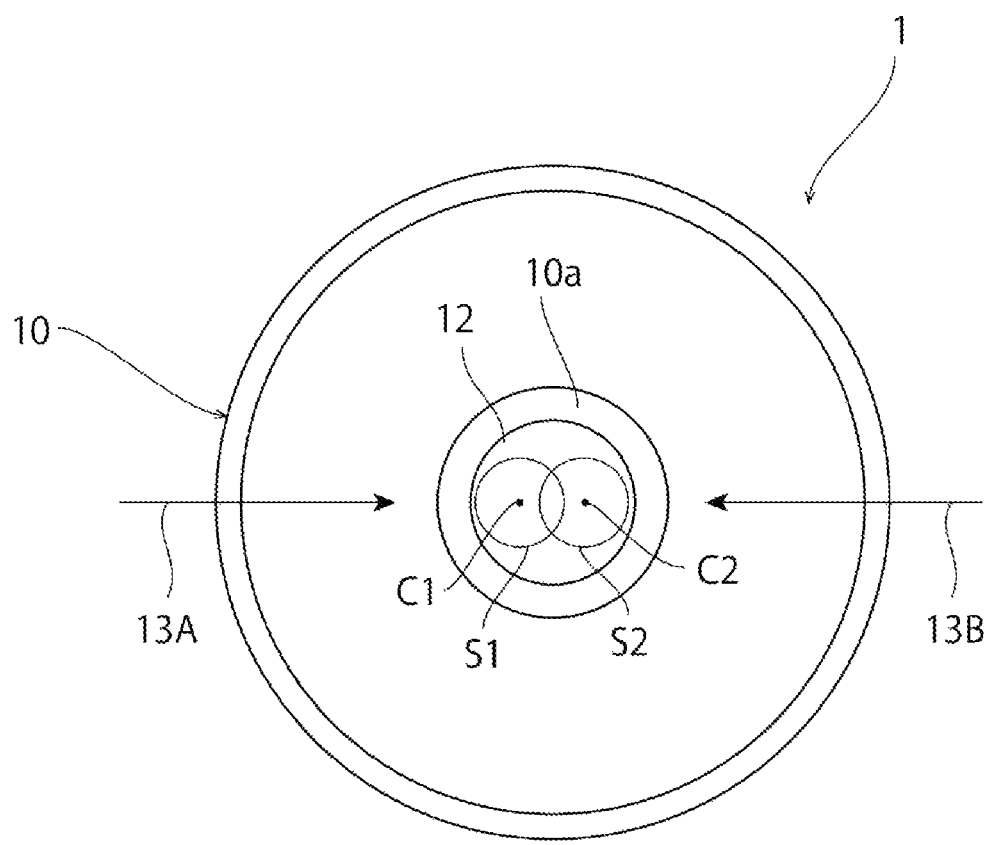

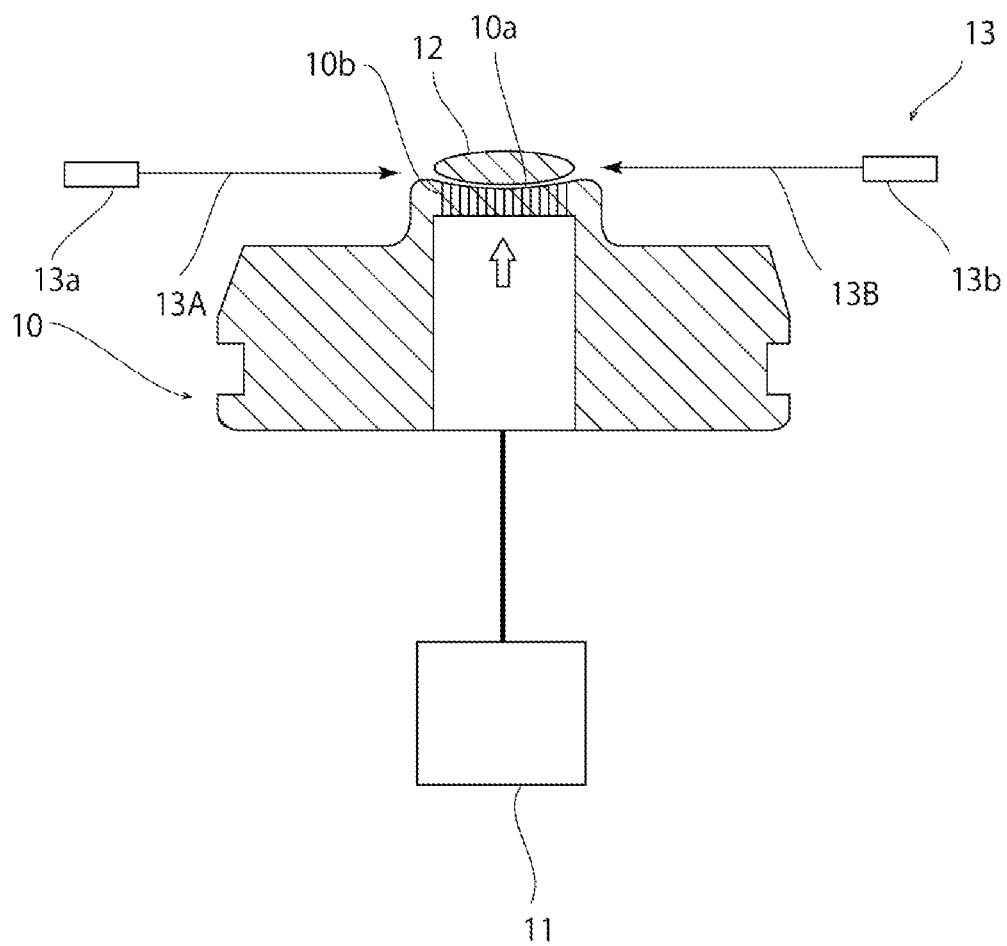
[Fig. 4]

[Fig. 5]
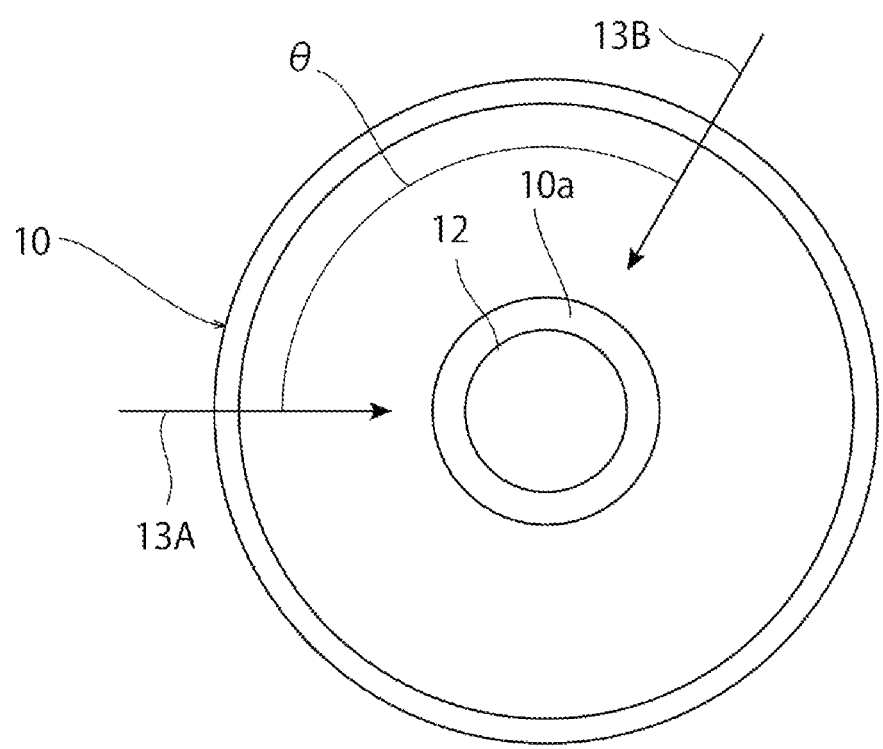

[Fig. 6]
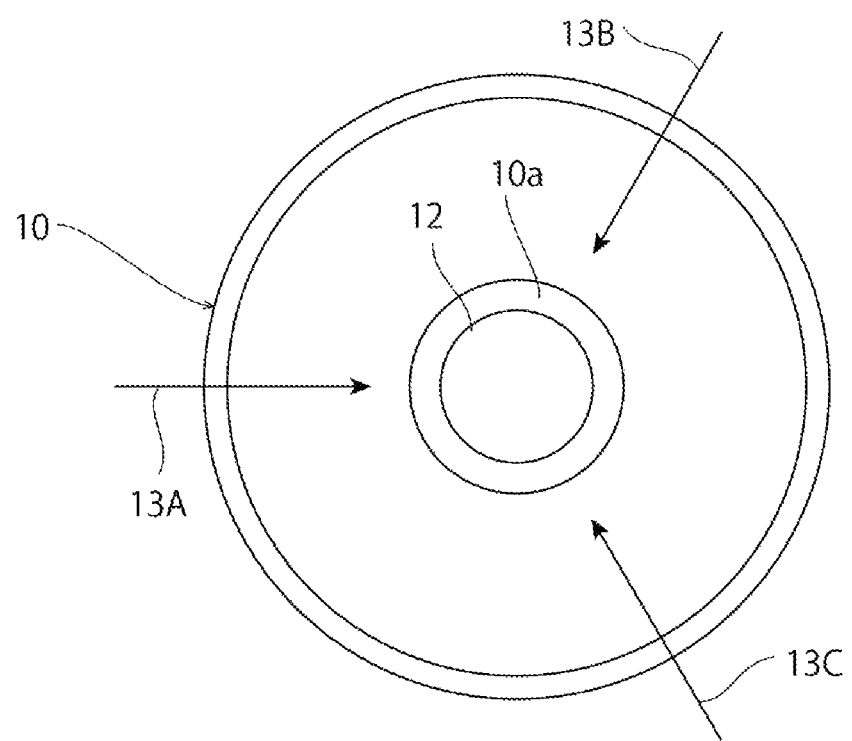

[Fig. 7]
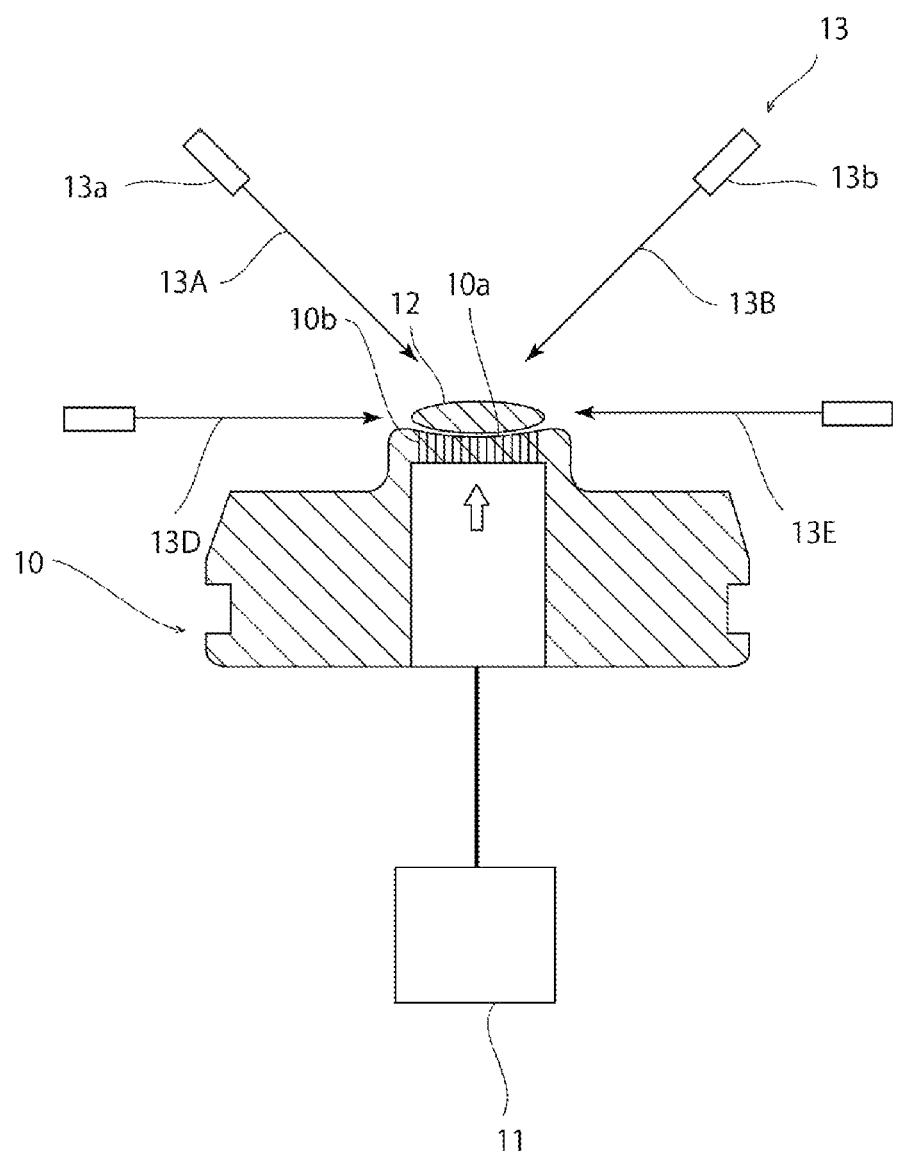

[Fig. 8]
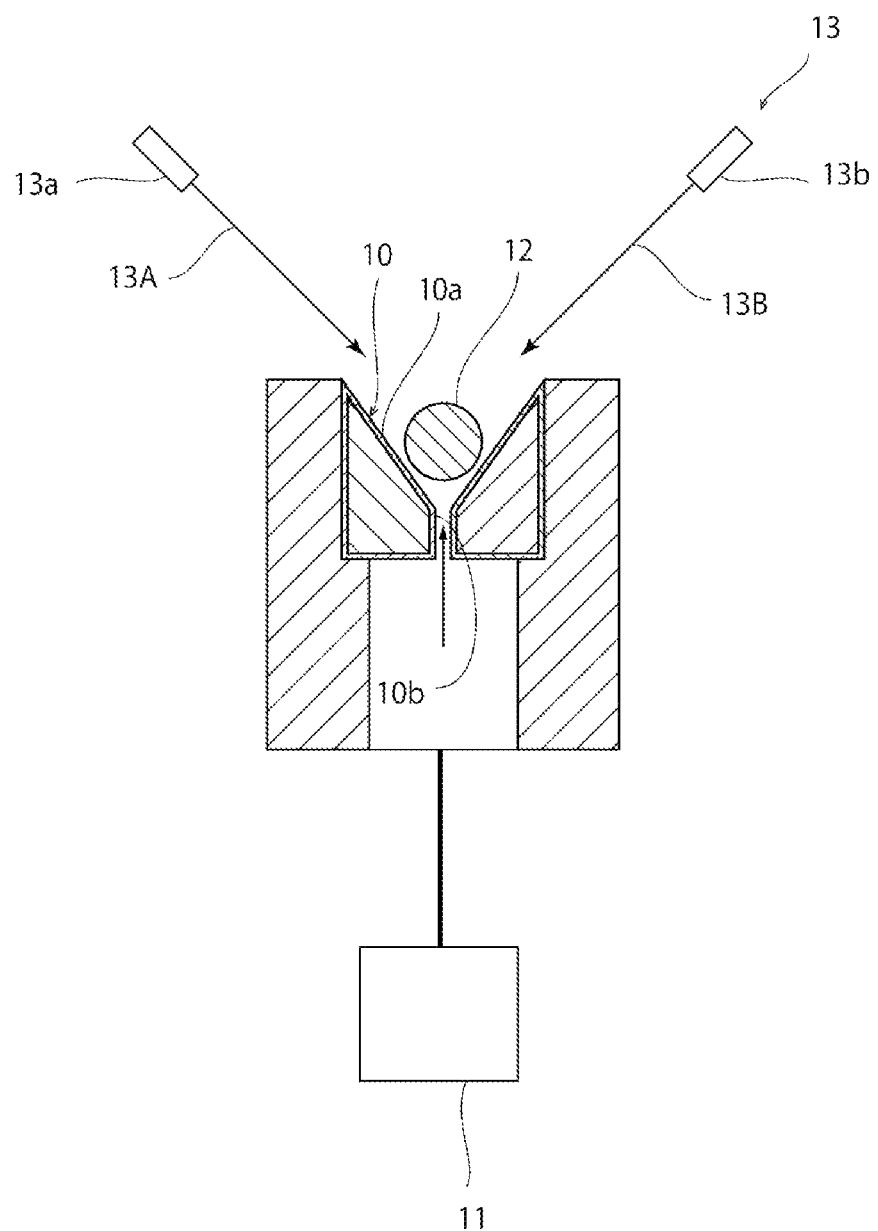

[Fig. 9]
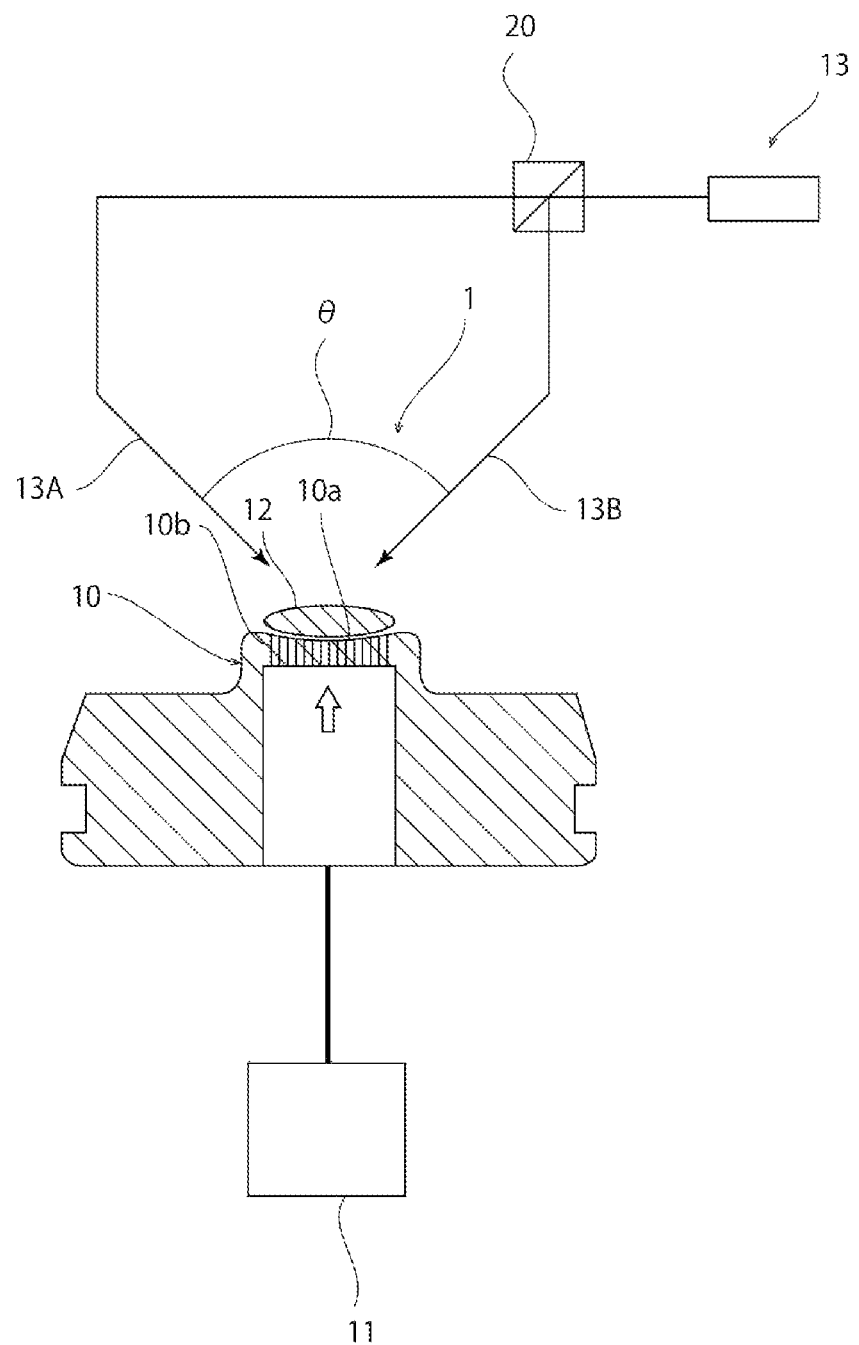

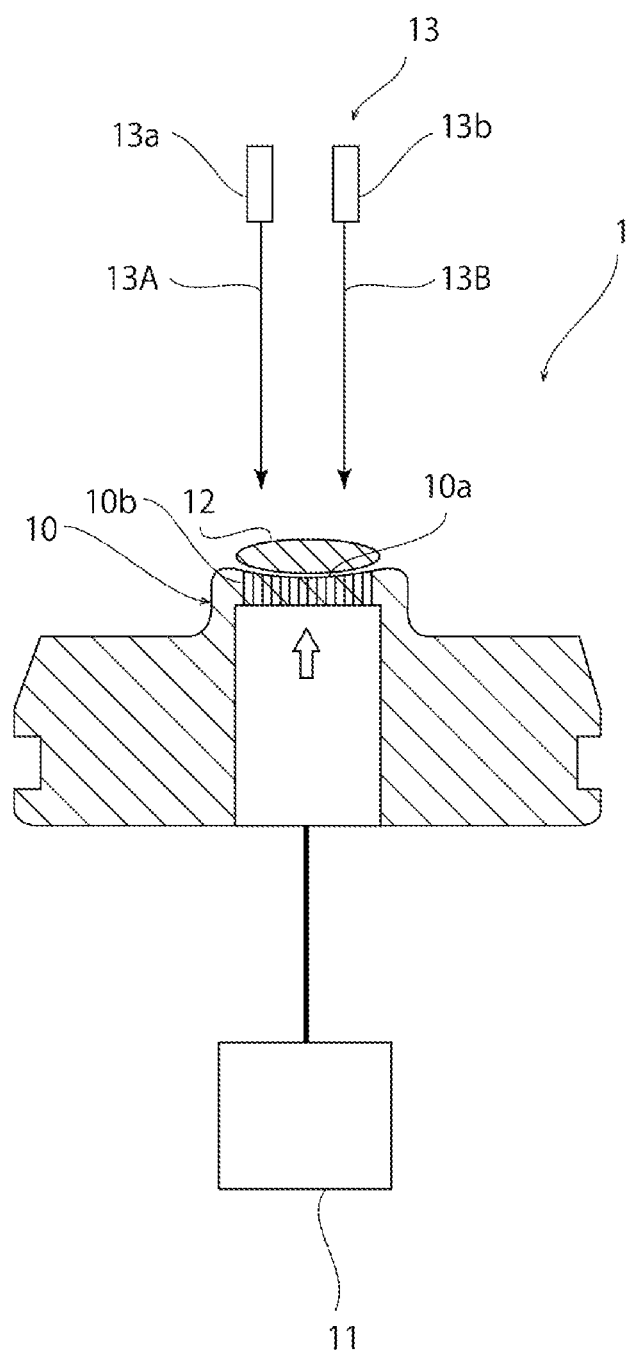
[Fig. 10]

[Fig. 11]
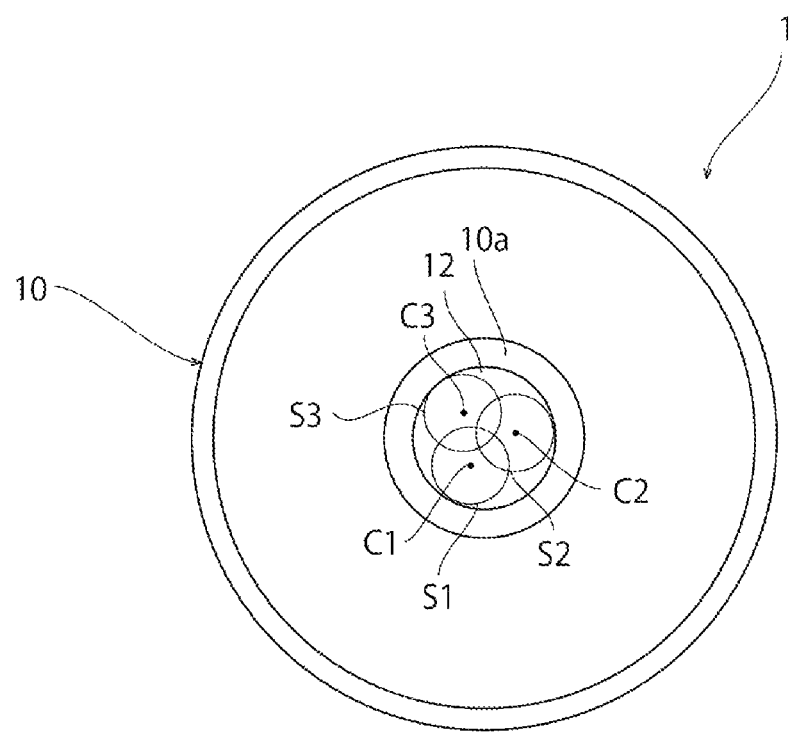

[Fig. 12]
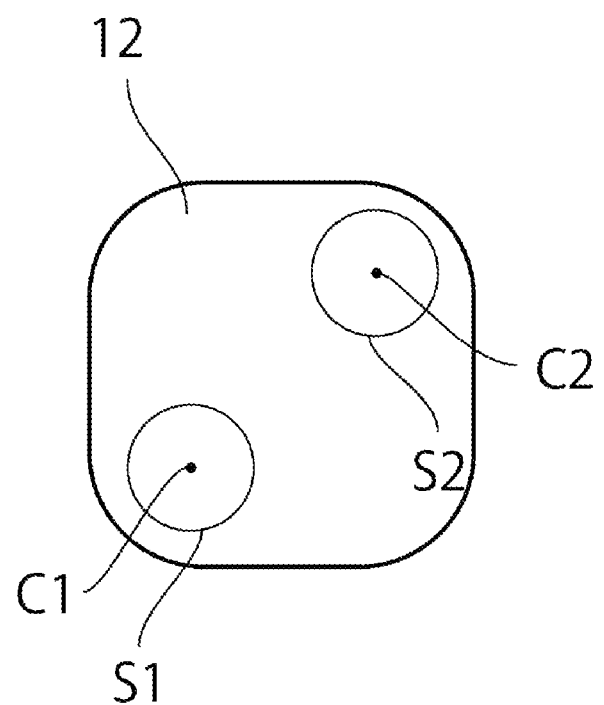

[Fig. 13]
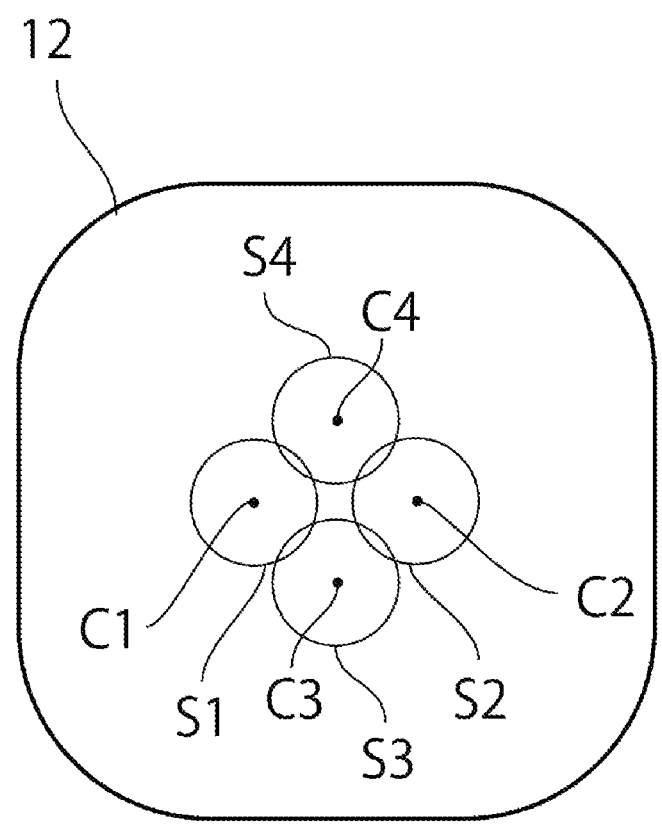

[Fig. 14]
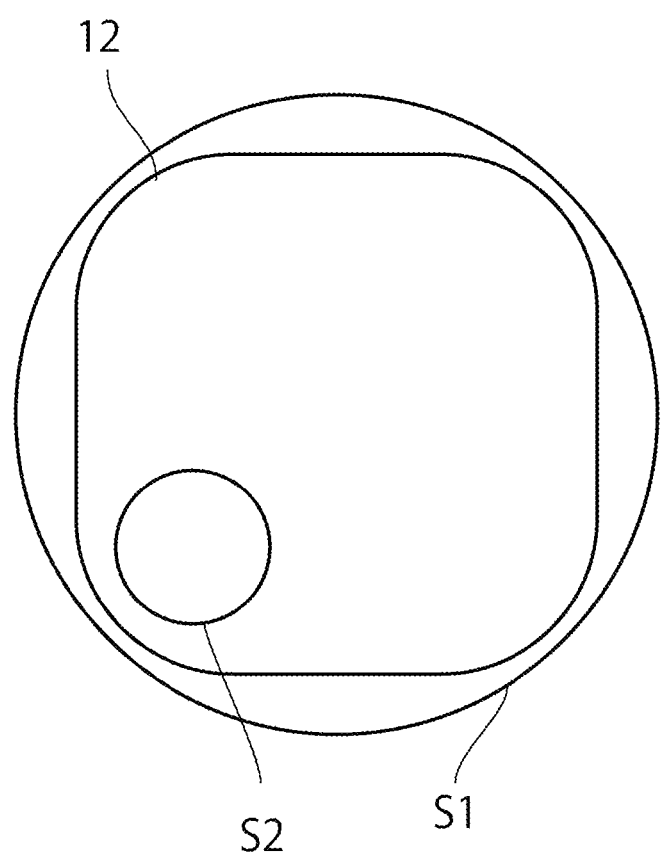

[Fig. 15]
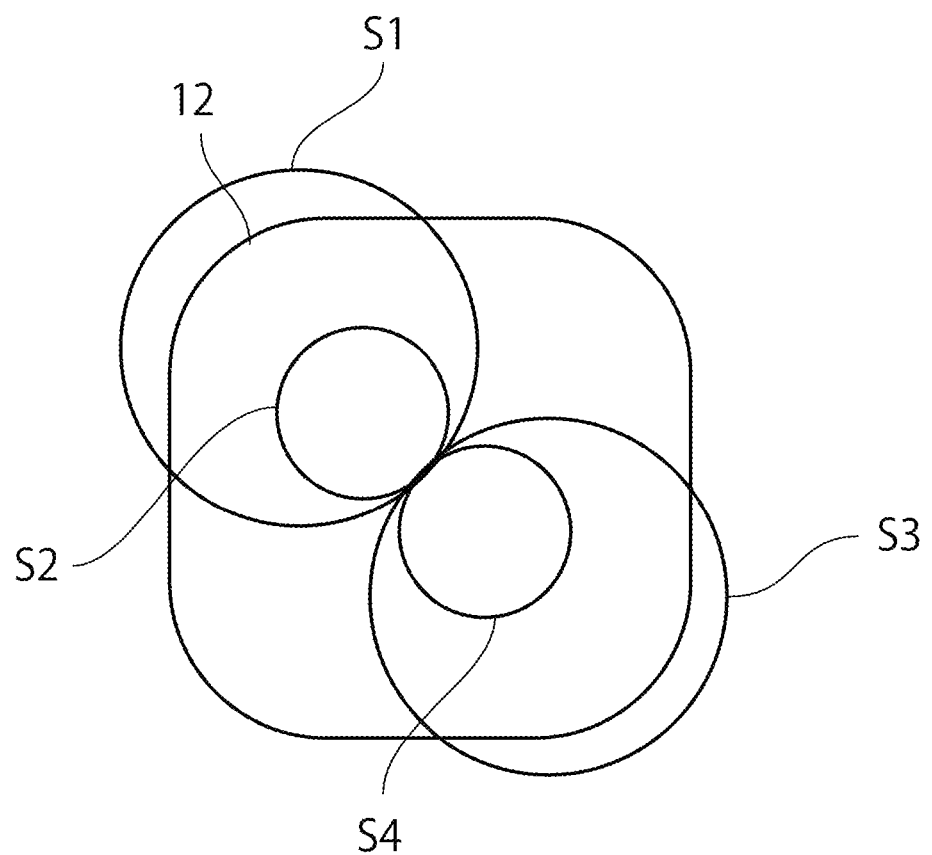

METHOD FOR MANUFACTURING GLASS MATERIAL AND DEVICE FOR MANUFACTURING GLASS MATERIAL

TECHNICAL FIELD

This invention relates to methods for manufacturing a glass material and devices for manufacturing a glass material.

BACKGROUND ART

In recent years, studies on containerless levitation techniques as methods for manufacturing a glass material are being conducted. For example, Patent Literature 1 describes a method in which a barium-titanium-based ferroelectric sample levitated in an aerodynamic levitation furnace is heated and melted by irradiation with a laser beam and then cooled to vitrify. Whereas, in conventional methods of melting glass using a container, contact of molten glass with the wall surface of the container may cause crystals to precipitate, containerless levitation techniques can reduce the progression of crystallization due to contact of the molten glass with the wall surface of the container. Therefore, even materials that could not be vitrified by conventional manufacturing methods using a container can be vitrified by containerless levitation techniques. Hence, containerless levitation techniques are noteworthy as methods that can manufacture glass materials having novel compositions.

CITATION LIST

Patent Literature

Patent Literature 1: JP-A-2006-248801

SUMMARY OF INVENTION

Technical Problem

A challenge for containerless levitation techniques is to improve the homogeneity of a glass material. Patent Literature 1 discloses, therefore, that a large area of a block of glass raw material is irradiated with laser light using a plurality of lasers. However, it is difficult to obtain sufficiently homogeneous glass even by this method.

A principal object of the present invention is to provide a method that can manufacture a glass material having excellent homogeneity by containerless levitation.

Solution to Problem

In a method for manufacturing a glass material according to the present invention, a block of glass raw material is heated and melted by irradiation with a plurality of laser beams with the block of glass raw material held levitated above a forming surface of a forming die, thus obtaining a molten glass, and the molten glass is then cooled to obtain a glass material. The plurality of laser beams include a first laser beam and a second laser beam. A size ($\theta$) of an angle formed between the first laser beam and the second laser beam is 0° or more but less than 180°. A center position of a spot of the first laser beam on a surface of the block of glass raw material and a center position of a spot of the second laser beam on the surface of the block of glass raw material are different from each other.

In the method for manufacturing a glass material according to the present invention, the spot of the first laser beam on the surface of the block of glass raw material and the spot of the second laser beam preferably overlap each other.

In the method for manufacturing a glass material according to the present invention, the block of glass raw material may be irradiated with the laser beams from an upper diagonal position.

In a method for manufacturing a glass material according to the present invention, the block of glass raw material may be held levitated above the forming surface of the forming die by jetting gas through a gas jet hole opening on the forming surface.

In the method for manufacturing a glass material according to the present invention, the spot of each of the laser beams on the surface of the block of glass raw material preferably has a diameter 0.1 times to 1.2 times that of the block of glass raw material.

A glass material manufacturing device according to the present invention is a device for manufacturing a glass material by heating and melting a block of glass raw material by irradiation with a plurality of laser beams including a first laser beam and a second laser beam with the block of glass raw material held levitated above a forming surface of a forming die, thus obtaining a molten glass, and then cooling the molten glass to obtain a glass material. The glass material manufacturing device according to the present invention includes a laser applicator capable of emitting the plurality of laser beams. A size ($\theta$) of an angle formed between the first laser beam and the second laser beam is 0° or more but less than 180°. A center position of a spot of the first laser beam on a surface of the block of glass raw material and a center position of a spot of the second laser beam on the surface of the block of glass raw material are different from each other.

Advantageous Effects of Invention

The present invention can provide a method that can manufacture a glass material having excellent homogeneity by containerless levitation.

BRIEF DESCRIPTION OF DRAWINGS

FIG. 1 is a schematic cross-sectional view of a glass material manufacturing device according to a first embodiment.

FIG. 2 is a diagrammatic plan view of a portion of a forming surface in the first embodiment.

FIG. 3 is a schematic plan view of the glass material manufacturing device according to the first embodiment.

FIG. 4 is a schematic cross-sectional view of a glass material manufacturing device according to a second embodiment.

FIG. 5 is a diagrammatic plan view of a portion of a forming surface in the second embodiment.

FIG. 6 is a diagrammatic plan view of a portion of a forming surface in a third embodiment.

FIG. 7 is a schematic cross-sectional view of a glass material manufacturing device according to a fourth embodiment.

FIG. 8 is a schematic cross-sectional view of a glass material manufacturing device according to a fifth embodiment.

FIG. 9 is a schematic cross-sectional view of a glass material manufacturing device according to a sixth embodiment.

FIG. 10 is a schematic cross-sectional view of a glass material manufacturing device according to a seventh embodiment.

FIG. 11 is a schematic plan view of a glass material manufacturing device according to an eighth embodiment.

FIG. 12 is a schematic plan view showing the relation between a glass material and spots of laser beams in a ninth embodiment.

FIG. 13 is a schematic plan view showing the relation between a glass material and spots of laser beams in a tenth embodiment.

FIG. 14 is a schematic plan view showing the relation between a glass material and spots of laser beams in an eleventh embodiment.

FIG. 15 is a schematic plan view showing the relation between a glass material and spots of laser beams in a twelfth embodiment.

DESCRIPTION OF EMBODIMENTS

Hereinafter, a description will be given of preferred embodiments for working of the present invention. However, the following embodiments are merely illustrative. The present invention is not at all limited to the following embodiments.

Throughout the drawings to which the embodiments and the like refer, elements having substantially the same functions will be referred to by the same reference signs. The drawings to which the embodiments and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

In the following embodiments, not only normal glass materials but also glass materials having compositions that could not be vitrified by melting methods using containers, such as for example those free from a network forming oxide, can be suitably manufactured. Specifically, for example, barium titanate-based glass materials, lanthanum-niobium composite oxide-based glass materials, lanthanum-niobium-aluminum composite oxide-based glass materials, lanthanum-niobium-tantalum composite oxide-based glass materials, lanthanum-tungsten composite oxide-based glass materials, and so on can be suitably manufactured.

First Embodiment

FIG. 1 is a schematic cross-sectional view of a glass material manufacturing device 1 according to a first embodiment. As shown in FIG. 1, the glass material manufacturing device 1 includes a forming die 10. The forming die 10 has a curved forming surface 10a. Specifically, the forming surface 10a is spherical.

The forming die 10 has gas jet holes 10b opening on the forming surface 10a. As shown in FIG. 2, in this embodiment, a plurality of gas jet holes 10b are provided. Specifically, the plurality of gas jet holes 10b are arranged radially from the center of the forming surface 10a.

The forming die 10 may be made of a porous body having interconnected cells. In this case, the gas jet hole 10b is formed of interconnected cells.

The gas jet holes 10b are connected to a gas supply mechanism 11, such as a compressed gas cylinder. Gas is supplied from this gas supply mechanism 11 via the gas jet holes 10b to the forming surface 10a.

No particular limitation is placed on the type of the gas. The gas may be, for example, air or oxygen or may be inert gas, such as nitrogen, argon or helium gas.

In manufacturing a glass material using the manufacturing device 1, first, a block 12 of glass raw material is placed on the forming surface 10a. The block 12 of glass raw material may be, for example, one obtained by forming raw material powders for a glass material in a single piece by press forming or so on. The block 12 of glass raw material may be a sintered body obtained by forming raw material powders for a glass material in a single piece by press forming or so on and then sintering the single piece. Alternatively, the block 12 of glass raw material may be an aggregate of crystals having the same composition as a desired glass composition.

No particular limitation is placed on the shape of the block 12 of glass raw material. The block 12 of glass raw material may have, for example, a lens-like, spherical, cylindrical, polygonal-prism, rectangular parallelepiped, or oval-spherical shape.

Next, gas is jetted out through the gas jet holes 10b, thus levitating the block 12 of glass raw material above the forming surface 10a. In other words, the block 12 of glass raw material is held, out of contact with the forming surface 10a, in the air. In this state, the block 12 of glass raw material is irradiated with laser light from a laser applicator 13. Thus, the block 12 of glass raw material is heated and melted to make it vitrifiable, thereby obtaining a molten glass. Thereafter, the molten glass is cooled, so that a glass material can be obtained. At least during the process of heating and melting the block 12 of glass raw material and the process of cooling the molten glass and in turn the glass material at least to below the softening point, at least the jetting of gas is preferably continued to reduce the contact of the block 12 of glass raw material, the molten glass or the glass material with the forming surface 10a.

As shown in FIGS. 1 and 3, the laser applicator 13 includes a first laser light source 13a and a second laser light source 13b. The first and second laser light sources 13a, 13b apply laser beams 13A, 13B, respectively, to the block 12 of glass raw material from an upper diagonal position.

Meanwhile, generally, in irradiating a block of glass raw material with a plurality of laser beams, the centers of spots of the plurality of laser beams on the surface of the block of glass raw material are allowed to coincide with each other. This is because it is prevented that the laser beams directly enter the forming surface to undesirably heat the forming surface.

However, intensive studies by the present inventors have revealed that when the spot centers of a plurality of laser beams on the surface of the block of glass raw material are allowed to coincide with each other, uneven melting of the block of glass raw material is likely to occur. The reason for this can be considered as follows. The intensity of a laser beam is highest at the spot center and gradually decreases outwardly in the spot. Therefore, when the spot centers of a plurality of laser beams on the surface of a block of glass raw material are allowed to coincide with each other, a portion of the block of glass raw material located at the spot centers is more intensively heated than the other portions. As a result, the portion of the block of glass raw material located at the spot centers is overheated, whereas portions of the block of glass raw material located away from the spot centers are less likely to melt. It can be assumed that for this reason uneven melting of the block of glass raw material occurs. Furthermore, if the portion of the block of glass raw material located at the spot centers is intensively heated, the glass raw material is likely to volatilize, which may prevent a desired glass composition from being achieved.

In contrast, in this embodiment, as shown in FIG. 1, the size (θ) of the angle formed between the laser beam 13A and the laser beam 13B is set at 0° or more but less than 180°. Additionally, as shown in FIG. 3, the first and second laser beams 13A, 13B are applied so that the position of the center C1 of a spot S1 of the first laser beam 13A on the surface of the block 12 of glass raw material and the position of the center C2 of a spot S2 of the second laser beam 13B on the surface of the block 12 of glass raw material are different from each other. In this case, the position of the center C1 of the spot S1 at which the intensity reaches the highest level by irradiation with the first laser beam 13A is different from the position of the center C2 of the spot S2 at which the intensity reaches the highest level by irradiation with the second laser beam 13B. Thus, a wide area of the surface of the block 12 of glass raw material can be irradiated with laser beams and unevenness in intensity of laser light in the portions of the surface of the block 12 of glass raw material irradiated with the laser beams can be reduced. Furthermore, the block 12 of glass raw material has a plurality of portions serving as starting points for melting. Therefore, the block 12 of glass raw material can be more homogeneously melted. Because the block 12 of glass raw material is less likely to be partly overheated, undesirable volatilization of the raw material can be reduced. It is possible to reduce partly insufficient heating of the block 12 of glass raw material and the resultant occurrence of unmelted portions. As a result, a glass material having excellent homogeneity can be produced.

From the viewpoint of melting the block 12 of glass raw material with higher homogeneity, the first and second laser beams 13A, 13B are preferably applied so that the spot S1 of the first laser beam 13A on the surface of the block 12 of glass raw material and the spot S2 of the second laser beam 13B on the surface of the block 12 of glass raw material at least partly overlap each other. By doing so, the melting of the block 12 of glass raw material can be promoted at a position where the first spot S1 and the second spot S2 overlap each other.

It may be conceivable to apply the first laser beam and the second laser beam from exactly opposite directions to form an angle θ of 180°. In this case, however, the first laser beam may be applied to the second laser light source or the second laser beam may be applied to the first laser light source, which may damage the laser light source. Furthermore, it is less likely that the spot of the first laser beam and the spot of the second laser beam overlap each other on the surface of the block 12 of glass raw material. Therefore, θ is preferably less than 180°. The angle θ is more preferably 50° to 150° and still more preferably 60° to 120°.

The diameter (spot diameter) of the spots S1, S2 is preferably 0.1 times to 1.2 times, more preferably 0.4 times to 1.1 times, and still more preferably 0.5 times to 1 time the diameter of the block 12 of glass raw material. If the spot diameter is too small relative to the diameter of the block 12 of glass raw material, the entire block 12 of glass raw material may be less likely to be uniformly heated. If the spot diameter is too large relative to the diameter of the block 12 of glass raw material, the laser beams 13A, 13B are likely to be applied to the forming surface 10a or the area of overlap between the spot S1 and the spot S2 may be too large. The spot S1 preferably does not overlap the center C2 of the spot S2. The spot S2 preferably does not overlap the center C1 of the spot S1.

In this embodiment, a description has been given of an example where the block 12 of glass raw material is irradiated with the first and second laser beams 13A, 13B. However, the present invention is not limited to this. For example, the block of glass raw material may be irradiated with three or more laser beams. The number of laser beams with which the block of glass raw material is irradiated is preferably two to five and more preferably two to four.

The percentage of the area of a portion of each laser spot applied to the block of glass raw material in the area of the laser spot is preferably 50% or more, more preferably 70% or more, still more preferably 90% or more, and particularly preferably 100%. If the percentage is too low, the energy applied to the block of glass raw material decreases, which may make the melting of the block of glass raw material insufficient. Furthermore, the laser beam may be applied to the forming surface and thus damage it. The percentage of the total area of the portions of the laser spots applied to the block of glass raw material in the total area of the laser spots also preferably satisfies the above range.

In this embodiment, a description has been given of an example where the block of glass raw material is held levitated above the forming surface 10a of the forming die 10 by jetting gas through the gas jet holes 10b opening on the forming surface 10a. However, the present invention is not limited to this. For example, the block of glass raw material may be held levitated using a magnetic field, a static electric field, sonic waves or other means.

Second and Third Embodiments

FIG. 4 is a schematic cross-sectional view of a glass material manufacturing device according to a second embodiment. FIG. 5 is a schematic plan view of the glass material manufacturing device according to the second embodiment. Furthermore, FIG. 6 is a schematic cross-sectional view of a glass material manufacturing device according to a third embodiment. In the first embodiment, a description has been given of an example where the block 12 of glass raw material is irradiated with the laser beams 13A, 13B from an upper diagonal position. However, the present invention is not limited to this.

For example, as shown in FIGS. 4 and 5, the block 12 of glass raw material may be irradiated horizontally with the laser beams 13A, 13B. In this case, as shown in FIG. 6, the block 12 of glass raw material may be irradiated with three laser beams 13A, 13B, 13C. When the block 12 of glass raw material is irradiated with three or more laser beams, the size of the angle formed between each adjacent laser beam is preferably substantially the same. Therefore, when the block 12 of glass raw material is irradiated with three laser beams 13A, 13B, 13C, the size of the angle formed between the adjacent laser beams is preferably approximately 120°.

Fourth Embodiment

FIG. 7 is a schematic cross-sectional view of a glass material manufacturing device according to a fourth embodiment. As shown in FIG. 7, while the block 12 of glass raw material is irradiated with the first and second laser beams 13A, 13B from an upper diagonal position, the block 12 of glass raw material may be irradiated horizontally with third and fourth laser beams 13D, 13E.

Fifth Embodiment

FIG. 8 is a schematic cross-sectional view of a glass material manufacturing device according to a fifth embodiment.

In the first to fourth embodiments, a description has been given of an example where a plurality of gas jet holes 10b open on the forming surface 10a. However, the present invention is not limited to this configuration. For example, like a glass material manufacturing device shown in FIG. 8, a single gas jet hole 10b opening at the center of the forming surface 10a may be provided.

Sixth Embodiment

FIG. 9 is a schematic cross-sectional view of a glass material manufacturing device according to a sixth embodiment.

In the first to fifth embodiments, a description has been given of an example where one laser beam is emitted from one laser light source. However, the present invention is not limited to this. For example, a laser beam from a single laser light source may be split using a beam splitter 20 to forma plurality of laser beams 13A, 13B.

Seventh Embodiment

FIG. 10 is a schematic cross-sectional view of a glass material manufacturing device according to a seventh embodiment. As shown in FIG. 10, the block of glass raw material may be irradiated with the laser beam 13A and the laser beam 13B so that the laser beam 13A and the laser beam 13B are parallel with each other.

Eighth Embodiment

FIG. 11 is a schematic plan view of a glass material manufacturing device according to an eighth embodiment. As shown in FIG. 11, the block 12 of glass raw material may be irradiated with three or more laser beams. Specifically, in this embodiment, the block 12 of glass raw material is irradiated with three laser beams. In this case, the spot S1, the spot S2, and the spot S3 may or may not overlap each other. In this embodiment, three laser beams are applied so that all of the spot S1, the spot S2, and the spot S3 overlap one another on the central region of the block 12 of glass raw material.

By irradiating the block 12 of glass raw material with three or more laser beams as in this embodiment, temperature unevenness occurring in the block 12 of glass raw material can be further reduced.

Ninth Embodiment

FIG. 12 is a schematic plan view showing the relation between a glass material and spots of laser beams in a ninth embodiment. In the ninth embodiment, the spots S1, S2 of laser beams are formed on a peripheral region of the block 12 of glass raw material. Because the peripheral region of the block 12 of glass raw material is likely to be cooled by a gas for levitation, the occurrence of temperature unevenness in the block 12 of glass raw material can be reduced by irradiating the peripheral region of the block 12 of glass raw material with the laser beams.

Tenth Embodiment

FIG. 13 is a schematic plan view showing the relation between a glass material and spots of laser beams in a tenth embodiment. As shown in FIG. 13, in the tenth embodiment, the central region of the block 12 of glass raw material is irradiated with four laser beams to form spots S1, S2, S3, and S4. By thus irradiating the central region of the block 12 of glass raw material with laser beams in a concentrated manner, the rate of melting of the block 12 of glass raw material can be increased.

Eleventh Embodiment

FIG. 14 is a schematic plan view showing the relation between a glass material and spots of laser beams in an eleventh embodiment. As shown in FIG. 14, in the eleventh embodiment, while substantially the whole of the block 12 of glass raw material is heated by irradiation with a laser beam to form a spot S1 covering substantially the whole of the block 12 of glass raw material, the block 12 of glass raw material is melted by irradiation with another laser beam to forma spot S2. By doing so, the occurrence of temperature unevenness in the block 12 of glass raw material can be reduced. In the eleventh embodiment, it is preferred that the output of the laser beam for forming the spot S2 should be higher than the output of the laser beam for forming the spot S1.

Twelfth Embodiment

FIG. 15 is a schematic plan view showing the relation between a glass material and spots of laser beams in a twelfth embodiment. Also in the twelfth embodiment, like the eleventh embodiment, while the block 12 of glass raw material is wholly heated by irradiation with laser beams to form spots S1, S3, the block 12 of glass raw material is melted by irradiation with other laser beams to form spots S2, S4. Also by doing so, the occurrence of temperature unevenness in the block 12 of glass raw material can be reduced.

REFERENCE SIGNS LIST 1 manufacturing device
10 forming die
10a forming surface
10b gas jet hole
11 gas supply mechanism
12 block of glass raw material
13 laser applicator
13A-13E laser beam
13a first laser light source
13b second laser light source
20 beam splitter
C1, C2 center
S1 first spot
S2 second spot
S3 third spot
S4 fourth spot
C1 center of first spot
C2 center of second spot
C3 center of third spot
C4 center of fourth spot

The invention claimed is:

1. A method for manufacturing a glass material, the method comprising:
heating and melting a block of glass raw material by irradiation with a plurality of laser beams with the block of glass raw material held levitated, thus obtaining a molten glass, and then cooling the molten glass to obtain a glass material, wherein
the plurality of laser beams include a first laser beam and a second laser beam, a size (θ) of an angle formed between the first laser beam and the second laser is being 0° or more but less than 180°, a center position of a spot of the first laser beam on a surface of the block of glass raw material and a center position of a spot of the second laser beam on the surface of the block of glass raw material are different from each other, and the block of glass raw material is irradiated with the plurality of laser beams from an upper diagonal position.

2. The method for manufacturing a glass material according to claim 1, wherein the spot of the first laser beam on the surface of the block of glass raw material and the spot of the second laser beam on the surface of the block of glass raw material overlap each other.

3. The method for manufacturing a glass material according to claim 1, wherein the block of glass raw material is held levitated above a forming surface of a forming die by jetting gas through a gas jet hole opening on the forming surface.

4. The method for manufacturing a glass material according to claim 1, wherein the spot of each of the laser beams on the surface of the block of glass raw material has a diameter 0.1 to 1.2 times that of the block of glass raw material.

5. A device for manufacturing a glass material by heating and melting a block of glass raw material by irradiation with a plurality of laser beams including a first laser beam and a second laser beam with the block of glass raw material held levitated, thus obtaining a molten glass, and then cooling the molten glass to obtain a glass material, the device comprising:

a laser applicator capable of emitting the plurality of laser beams, wherein a size (θ) of an angle formed between the first laser beam and the second laser beam is 0° or more but less than 180°, a center position of a spot of the first laser beam on a surface of the block of glass raw material and a center position of a spot of the second laser beam on the surface of the block of glass raw material are different from each other, and the laser applicator is configured to irradiate the block of glass raw material with the plurality of laser beams from an upper diagonal position.

* * * * *